US010728551B2

(12) United States Patent
Abbas et al.

(10) Patent No.: US 10,728,551 B2
(45) Date of Patent: Jul. 28, 2020

(54) METHODS AND APPARATUS FOR BLOCK-BASED LAYOUT FOR NON-RECTANGULAR REGIONS BETWEEN NON-CONTIGUOUS IMAGING REGIONS

(71) Applicant: GoPro, Inc., San Mateo, CA (US)

(72) Inventors: Adeel Abbas, Carlsbad, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 79 days.

(21) Appl. No.: 16/143,224

(22) Filed: Sep. 26, 2018

(65) Prior Publication Data

US 2019/0141322 A1 May 9, 2019

Related U.S. Application Data

(60) Provisional application No. 62/583,991, filed on Nov. 9, 2017.

(51) Int. Cl.
| | |
|---|---|
| *H04N 19/119* | (2014.01) |
| *H04N 19/124* | (2014.01) |
| *H04N 19/14* | (2014.01) |
| *H04N 19/172* | (2014.01) |
| *H04N 19/176* | (2014.01) |

(52) U.S. Cl.
CPC ........ *H04N 19/119* (2014.11); *H04N 19/124* (2014.11); *H04N 19/14* (2014.11); *H04N 19/172* (2014.11); *H04N 19/176* (2014.11)

(58) Field of Classification Search
CPC .. H04N 19/119; H04N 19/176; H04N 19/124; H04N 19/14; H04N 19/172
See application file for complete search history.

(56) References Cited

U.S. PATENT DOCUMENTS

| 9,094,681 B1* | 7/2015 | Wilkins | H04N 19/119 |
|---|---|---|---|
| 10,104,286 B1* | 10/2018 | Yu | G06K 9/46 |
| 2016/0191798 A1* | 6/2016 | Yoo | H04N 19/23 |
| | | | 348/36 |
| 2017/0272758 A1* | 9/2017 | Lin | H04N 19/176 |
| 2018/0184121 A1* | 6/2018 | Kim | H04N 19/597 |
| 2019/0110060 A1* | 4/2019 | Wang | H04N 19/176 |

* cited by examiner

*Primary Examiner* — Brandon J Miller
(74) *Attorney, Agent, or Firm* — Gazdzinski & Associates, PC

(57) ABSTRACT

Apparatus and methods for providing block-based layouts for non-rectangular regions between non-contiguous imaging regions in projections such as, for example, Rotated Sphere Projections (RSP). In one embodiment, methods and apparatus for selecting coding unit block sizes for non-rectangular regions disposed between non-contiguous imaging portions is disclosed. The methods and apparatus may be configured to obtain a frame of captured imaging content, the frame of captured imaging content including the non-rectangular regions disposed between the non-contiguous imaging portions; select a plurality of differing coding block sizes for each of a plurality of regions located within the non-rectangular regions disposed between the non-contiguous imaging portions; determine which one of the plurality of differing coding block sizes optimizes an encoding efficiency for the obtained frame of captured imaging content; and encode the obtained frame of captured imaging content in accordance with the determined one off the plurality of differing coding block sizes.

20 Claims, 9 Drawing Sheets

| Anchor RSP | FW | FH | WS-PSNR (End to End) | | | SPSNR-NN (Cross Format) | | | WS-PSNR (codec) | | |
|---|---|---|---|---|---|---|---|---|---|---|---|
| | | | Y | U | V | Y | U | V | Y | U | V |
| Trolley | 1184 | 1184 | -8.4% | 1.9% | -2.2% | -8.3% | 1.9% | -2.1% | 3.9% | 1.6% | -2.7% |
| GasLamp | 1184 | 1184 | -4.1% | 2.1% | 6.5% | -4.1% | 2.2% | 6.4% | 4.6% | 1.7% | 6.9% |
| Skateboarding_in_lot | 1184 | 1184 | -16.8% | -16.4% | -17.3% | -16.9% | -16.4% | -17.2% | -12.0% | -16.4% | -17.0% |
| Chairlift | 1184 | 1184 | -23.7% | -17.2% | -17.8% | -23.6% | -17.1% | -17.7% | -21.5% | -17.7% | -18.5% |
| KiteFlite | 1184 | 1184 | -9.4% | -3.8% | -4.9% | -9.4% | -3.7% | -4.8% | -1.1% | -4.3% | -5.5% |
| Harbor | 1184 | 1184 | -8.3% | -3.6% | -3.1% | -7.9% | -3.7% | -3.1% | 4.2% | -3.9% | -3.1% |
| Balboa | 1184 | 1184 | -4.5% | -0.1% | -1.2% | -4.5% | 0.0% | -1.2% | -5.7% | -1.2% | -2.2% |
| Broadway | 1184 | 1184 | -1.1% | 1.8% | 1.5% | -1.1% | 1.3% | 1.6% | 3.0% | 0.7% | 0.4% |
| Landing | 1184 | 1184 | -4.3% | -0.5% | -2.7% | -4.4% | -0.5% | -2.6% | 4.5% | -4.9% | -6.4% |
| BranCastle | 1184 | 1184 | -8.6% | -6.3% | -5.3% | -8.7% | -6.2% | -5.2% | -1.0% | -9.3% | -9.3% |
| PoleVault | 960 | 960 | -9.8% | -11.5% | -10.9% | -9.7% | -11.6% | -10.7% | 0.3% | 9.0% | 10.1% |
| AerialCity | 960 | 960 | -0.9% | 1.8% | 2.1% | -0.9% | 1.8% | 2.2% | 19.7% | 20.2% | 21.3% |
| Overall | | | -8.3% | -4.3% | -4.6% | -8.3% | -4.3% | -4.5% | -0.6% | -2.0% | -2.2% |

METHODS AND APPARATUS FOR BLOCK-BASED LAYOUT FOR NON-RECTANGULAR REGIONS BETWEEN NON-CONTIGUOUS IMAGING REGIONS

PRIORITY

This application claims the benefit of priority to U.S. Provisional Patent Application Ser. No. 62/583,991 filed Nov. 9, 2017 of the same title, the contents of which are incorporated herein by reference in their entirety.

RELATED APPLICATIONS

This application is related to U.S. patent application Ser. No. 15/719,291 filed Sep. 28, 2017 and entitled "Methods and Apparatus for Providing In-Loop Padding Techniques for Rotated Sphere Projections", which claims the benefit of priority to U.S. Provisional Patent Application Ser. No. 62/481,013 filed Apr. 3, 2017 and entitled "Video Coding Techniques for Rotated Sphere Projections", the contents of which are incorporated herein by reference in their entirety.

This application is related to U.S. patent application Ser. No. 15/665,202 filed Jul. 31, 2017 and entitled "Methods and Apparatus for Providing a Frame Packing Arrangement for Panoramic Content", which claims the benefit of priority to U.S. Provisional Patent Application Ser. No. 62/477,936 filed Mar. 28, 2017 of the same title; U.S. Provisional Patent Application Ser. No. 62/473,952 filed Mar. 20, 2017 of the same title; U.S. Provisional Patent Application Ser. No. 62/465,678 filed Mar. 1, 2017 of the same title; U.S. Provisional Patent Application Ser. No. 62/462,804 filed Feb. 23, 2017 of the same title; and U.S. Provisional Patent Application Ser. No. 62/446,297 filed Jan. 13, 2017 and entitled "Methods and Apparatus for Rotated Sphere Projections", each of the foregoing being incorporated herein by reference in its entirety.

This application is also related to U.S. patent application Ser. No. 15/289,851 filed Oct. 10, 2016 and entitled "Apparatus and Methods for the Optimal Stitch Zone Calculation of a Generated Projection of a Spherical Image", which is incorporated herein by reference in its entirety.

This application is also related to U.S. patent application Ser. No. 15/234,869 filed Aug. 11, 2016 and entitled "Equatorial Stitching of Hemispherical Images in a Spherical Image Capture System", which claims the benefit of priority to U.S. Provisional Patent Application Ser. No. 62/204,290 filed on Aug. 12, 2015 and entitled "Equatorial Stitching of Hemispherical Images in a Spherical Capture System", each of the foregoing being incorporated herein by reference in its entirety.

This application is also related to U.S. patent application Ser. No. 15/406,175 filed Jan. 13, 2017 and entitled "Apparatus and Methods for the Storage of Overlapping Regions of Imaging Data for the Generation of Optimized Stitched Images", which is also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to various block based layouts for the encoding/decoding of non-rectangular regions between non-contiguous imaging regions and in one exemplary aspect, to methods and apparatus for optimizing coding efficiency and optimizing seam artifacts in, for example, Rotated Sphere Projections (RSP).

Description of Related Art

Panoramic images (e.g., spherical images) are typically obtained by capturing multiple images with overlapping fields of view from different cameras and combining ("stitching") these images together in order to provide, for example, a two-dimensional projection for use with modern display devices. Converting a panoramic image to a two-dimensional projection format can introduce some amount of distortion and/or affect the subsequent imaging data. However, two-dimensional projections are desirable for compatibility with existing image processing techniques and also for most user applications. In particular, many encoders and compression techniques assume traditional rectangular image formats.

Incipient interest into different projection formats has sparked research into a number of possible projection formats. Examples of prior art projection formats include without limitation e.g., equirectangular, cube map, equal-area cube map, octahedron, icosahedron, truncated square pyramid, and segmented sphere projection. For each of these projection formats, multiple facet (also called frame packing) arrangements are possible. A selection of prior art projections are described within e.g., "*AHG8: Algorithm description of projection format conversion in 360Lib*", published Jan. 6, 2017, to the Joint Video Exploration Team (JVET) of ITU-T SG 16 WP 3 and ISO/IEC JTC 1/SC 29/WG 11, the contents of which being incorporated herein by reference in its entirety.

While techniques exist that enable the encoding/decoding of this so-called panoramic content, extant encoding (and decoding) techniques for these panoramic images may prove sub-optimal, especially in the context of pre-existing codecs. For example, the encoding/decoding of panoramic images using pre-existing codecs may result in, inter alia, increased processing overhead, lack of adequate bandwidth (bitrate) considerations, and decreased compression efficiencies.

SUMMARY

The present disclosure satisfies the foregoing needs by providing, inter alia, methods and apparatus for the encoding/decoding of non-rectangular regions between non-contiguous imaging regions in projection formats such as, for example, RSP in order to improve upon, inter alia, encoding compression efficiencies.

In one aspect, an encoder apparatus is disclosed. In one embodiment, the encoder apparatus performs a method for selecting coding block sizes for non-rectangular regions disposed between non-contiguous imaging portions, the method including: obtaining a frame of captured imaging content, the frame of captured imaging content including the non-rectangular regions disposed between the non-contiguous imaging portions; selecting a plurality of differing coding block sizes for each of a plurality of regions located within the non-rectangular regions disposed between the non-contiguous imaging portions; determining which one of the plurality of differing coding block sizes improves an encoding efficiency for the obtained frame of captured imaging content; and encoding the obtained frame of captured imaging content in accordance with the determined one of the plurality of differing coding block sizes.

In another aspect, a decoder apparatus is disclosed. In one embodiment, the decoder apparatus is configured to decode the images encoded using the aforementioned encoder.

In yet another aspect, a method for encoding imaging data is disclosed. In one embodiment, the method includes: obtaining a frame of captured imaging content, the frame of captured imaging content including the non-rectangular regions disposed between the non-contiguous imaging portions; selecting a plurality of differing coding block sizes for each of a plurality of regions located within the non-rectangular regions disposed between the non-contiguous imaging portions; determining which one of the plurality of differing coding block sizes improves an encoding efficiency for the obtained frame of captured imaging content; and encoding the obtained frame of captured imaging content in accordance with the determined one of the plurality of differing coding block sizes.

In yet another aspect, a method for decoding imaging data is disclosed. In one embodiment, the method includes decoding an image received from the aforementioned encoder apparatus.

In yet another aspect, a computer-readable storage apparatus is disclosed. In one embodiment, the computer-readable storage apparatus includes a storage medium having a computer program stored thereon, the computer program including instructions, which when executed by a processor apparatus, performs the method including: obtaining a frame of captured imaging content, the frame of captured imaging content including the non-rectangular regions disposed between the non-contiguous imaging portions; selecting a plurality of differing coding block sizes for each of a plurality of regions located within the non-rectangular regions disposed between the non-contiguous imaging portions; determining which one of the plurality of differing coding block sizes improves an encoding efficiency for the obtained frame of captured imaging content; and encoding the obtained frame of captured imaging content in accordance with the determined one of the plurality of differing coding block sizes.

In yet another aspect, an integrated circuit (IC) apparatus is disclosed. In one embodiment, the IC apparatus is configured to: obtain a frame of captured imaging content, the frame of captured imaging content including the non-rectangular regions disposed between the non-contiguous imaging portions; select a plurality of differing coding block sizes for each of a plurality of regions located within the non-rectangular regions disposed between the non-contiguous imaging portions; determine which one of the plurality of differing coding block sizes improves an encoding efficiency for the obtained frame of captured imaging content; and encode the obtained frame of captured imaging content in accordance with the determined one of the plurality of differing coding block sizes.

In yet another aspect, a computing device is disclosed. In one embodiment, the computing device includes a signal generation device, the signal generation device configured to capture a plurality of frames of video data; a processing unit configured to process the plurality of frames of the video data; and a non-transitory computer-readable storage apparatus, the computer-readable storage apparatus including a storage medium having computer-readable instructions, the computer-readable instructions being configured to, when executed by the processing unit: obtain a frame of captured imaging content, the frame of captured imaging content including the non-rectangular regions disposed between the non-contiguous imaging portions; select a plurality of differing coding block sizes for each of a plurality of regions located within the non-rectangular regions disposed between the non-contiguous imaging portions; determine which one of the plurality of differing coding block sizes improves an encoding efficiency for the obtained frame of captured imaging content; and encode the obtained frame of captured imaging content in accordance with the determined one of the plurality of differing coding block sizes.

In another aspect, a method for selecting coding block sizes for non- rectangular regions disposed between non-contiguous imaging portions is disclosed. In one embodiment thereof, the method includes: obtaining a frame of captured imaging content, the frame of captured imaging content including the non-rectangular regions disposed between the non-contiguous imaging portions; selecting a plurality of differing coding block sizes for each of a plurality of regions located within the non-rectangular regions disposed between the non- contiguous imaging portions; determining which one of the plurality of differing coding block sizes improves an encoding efficiency for the obtained frame of captured imaging content as compared with other ones of the plurality of differing coding block sizes; and encoding the obtained frame of captured imaging content in accordance with the determined one of the plurality of differing coding block sizes.

In another aspect, a computing system is disclosed. In one embodiment thereof, the computing system includes: a non-transitory computer readable apparatus including a storage medium having a computer program stored thereon, the computer program being configured to, when executed by a processor apparatus, perform: a selection of a plurality of differing coding block sizes for each of a plurality of regions; determination of which one of the plurality of differing coding block sizes improves an encoding efficiency for an obtained frame of captured imaging content as compared with other ones of the plurality of differing coding block sizes; and encode of the obtained frame of captured imaging content in accordance with the determined one of the plurality of differing coding block sizes.

In another aspect, a non-transitory computer readable apparatus is disclosed. In one embodiment thereof, the non-transitory computer readable apparatus includes a storage medium having a computer program stored thereon, the computer program being configured to, when executed by a processor apparatus, select coding block sizes for non-rectangular regions disposed between non-contiguous imaging portions within an obtained frame of captured imaging content via: a selection of a plurality of differing coding block sizes for each of a plurality of regions; determination of which one of the plurality of differing coding block sizes improves an encoding efficiency for an obtained frame of captured imaging content as compared with other ones of the plurality of differing coding block sizes; and encode of the obtained frame of captured imaging content in accordance with the determined one of the plurality of differing coding block sizes.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

FIG. 6 are exemplary coding results for a circular region between non-contiguous imaging regions for various RSP frames, useful in describing the principles of the present disclosure.

FIG. 7 are exemplary coding results for the various RSP frames of FIG. 6 with a 16×16 block size, useful in describing the principles of the present disclosure.

All Figures disclosed herein are © Copyright 2018 GoPro, Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of so-called Rotated Sphere Projections (RSP) such as that described in co-owned and co-pending U.S. patent application Ser. No. 15/665,202 filed Jul. 31, 2017 and entitled "Methods and Apparatus for Providing a Frame Packing Arrangement for Panoramic Content", which claims the benefit of priority to U.S. Provisional Patent Application Ser. No. 62/477,936 filed Mar. 28, 2017 of the same title; U.S. Provisional Patent Application Ser. No. 62/473,952 filed Mar. 20, 2017 of the same title; U.S. Provisional Patent Application Ser. No. 62/465,678 filed Mar. 1, 2017 of the same title; U.S. Provisional Patent Application Ser. No. 62/462,804 filed Feb. 23, 2017 of the same title; and U.S. Provisional Patent Application Ser. No. 62/446,297 filed Jan. 13, 2017 and entitled "Methods and Apparatus for Rotated Sphere Projections", the contents of each of the foregoing incorporated supra, it is readily appreciated that the principles described herein can be equally applied to other projection formats that contain, inter alia, non-rectangular regions between non-contiguous imaging regions such as, for example Icosahedron Projections (ISP) and Octahedron Projections (OHP).

These and other variations would be readily apparent to one of ordinary skill given the contents of the present disclosure.

Block-Based Layout for Non-Rectangular Regions Between Non-Contiguous Imaging Regions—

Figure 1:
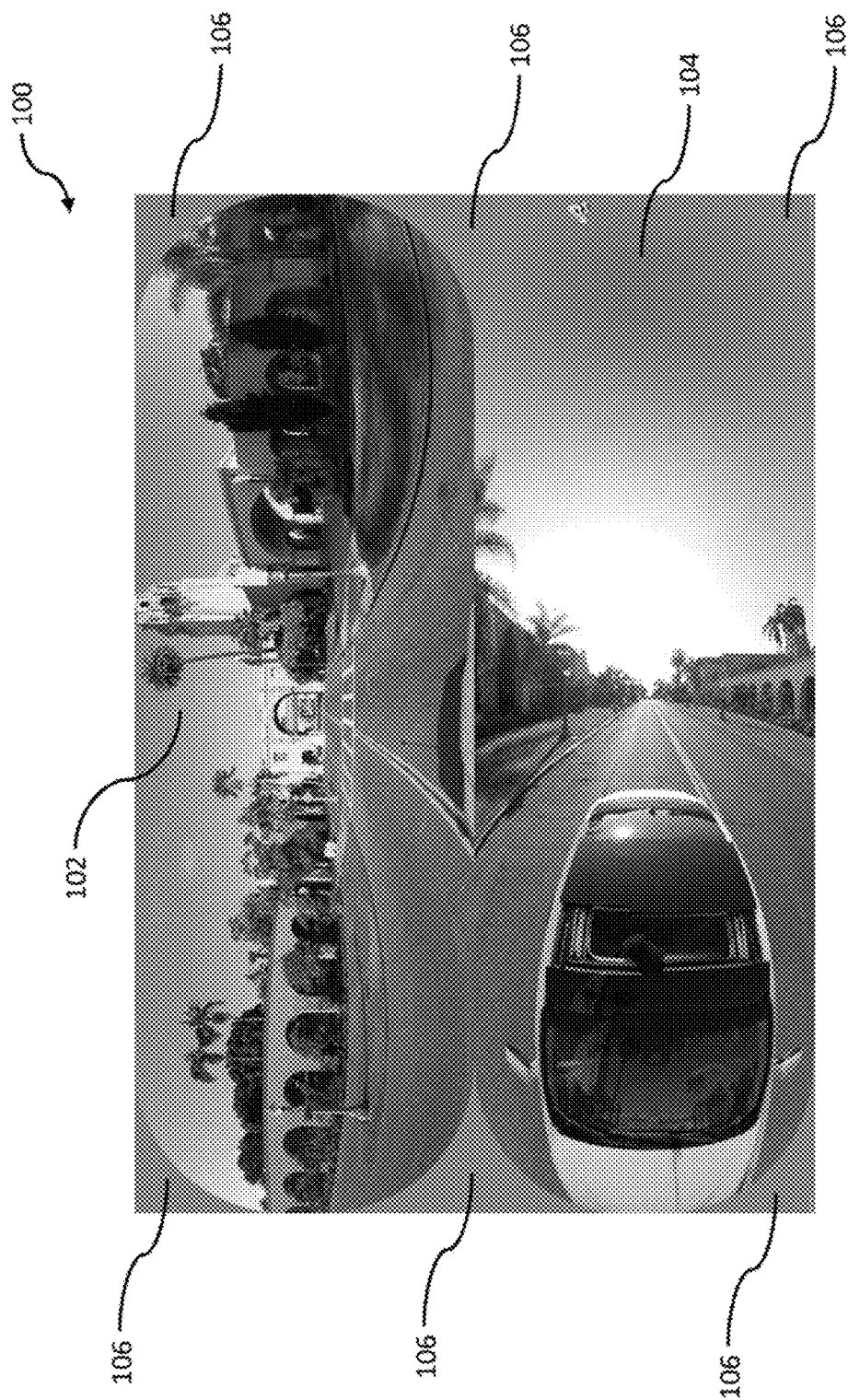
FIG. 1 is an exemplary Rotated Sphere Projection (RSP) frame, useful in describing the principles of the present disclosure.
Figure 2:
FIG. 2 is an exemplary Segmented Sphere Projection (SSP) frame, useful in describing the principles of the present disclosure.

FIGS. 1 and 2 illustrate exemplary projection formats which include non-rectangular regions between non-contiguous imaging regions. For example, FIG. 1 illustrates an exemplary RSP frame 100. As can be seen, the RSP frame 100 includes two main imaging facets 102, 104. The top imaging facet 102 includes four distinct regions that traditionally may include, for example, inactive pixel regions 106. Similarly, the bottom imaging facet 104 includes four distinct regions that may also include, for example, inactive pixel regions 106. FIG. 2 illustrates an exemplary Segmented Sphere Projection (SSP) frame 200. Similar to the discussion with respect to FIG. 1, the SSP frame 200 also includes non-rectangular regions between the top imaging facet 202, the bottom imaging facet 204 and the six (6) distinct regions 206 which may include, for example, inactive pixel regions. One exemplary purpose for these inactive pixel regions is disclosed in, inter alia, co-owned and co-pending U.S. patent application Ser. No. 15/719,291 filed Sep. 28, 2017 and entitled "Methods and Apparatus for Providing In-Loop Padding Techniques for Rotated Sphere Projections", which claims the benefit of priority to U.S. Provisional Patent Application Ser. No. 62/481,013 filed Apr. 3, 2017 and entitled "Video Coding Techniques for Rotated Sphere Projections", the contents of which were previously incorporated herein by reference in its entirety. In these exemplary examples, these inactive pixel regions 106, 206 may include circular arcs, which may be inefficient for block-based codecs to compress.

Figure 3:
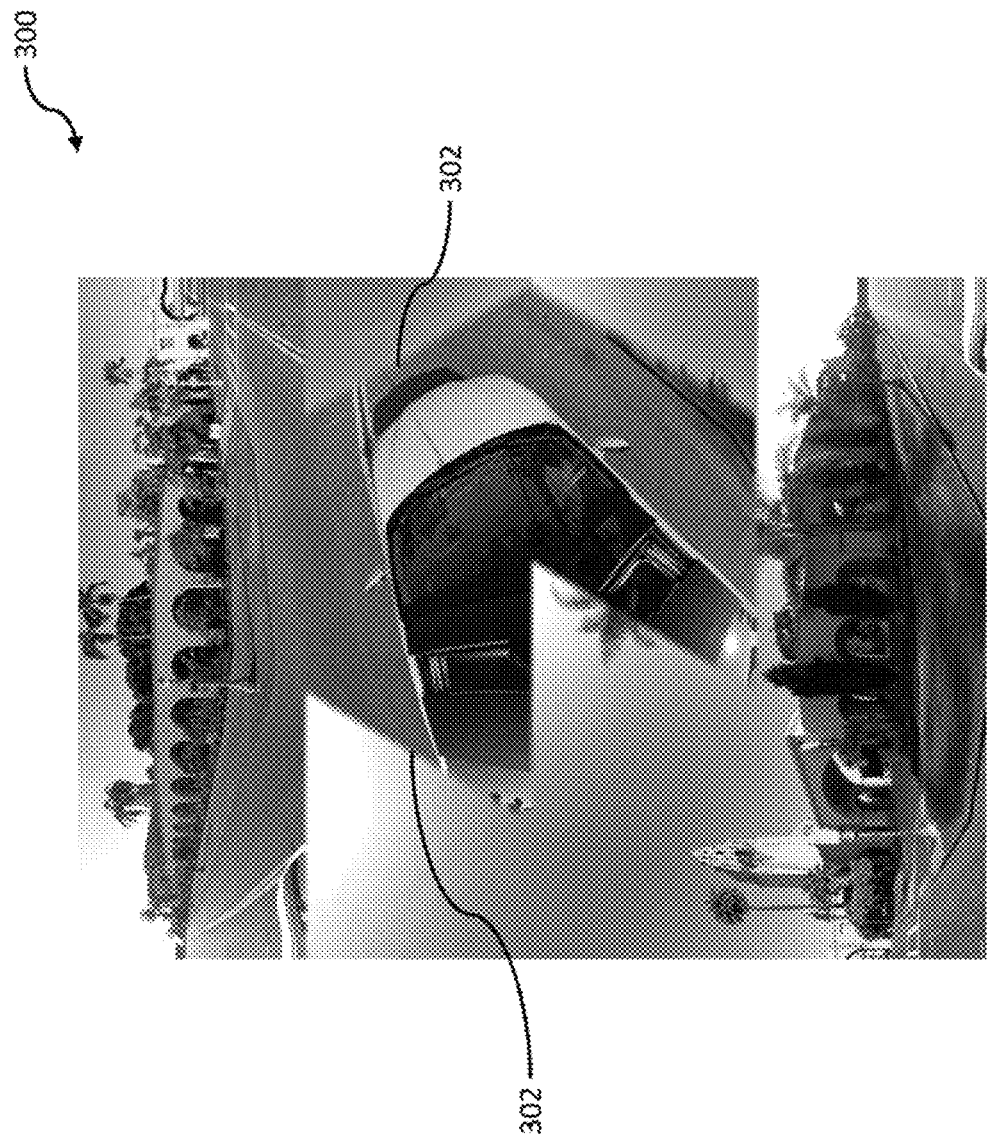
FIG. 3 is an exemplary Icosahedron Projection (ISP) frame, useful in describing the principles of the present disclosure.
Figure 4:
FIG. 4 is an exemplary Octahedron Projection (OHP) frame, useful in describing the principles of the present disclosure.

Referring now to FIGS. 3 and 4, an exemplary depiction of an Icosahedron Projection (ISP) 300 and Octahedron Projection (OHP) 400 is shown. However, unlike the embodiments illustrated in FIGS. 1 and 2, the ISP 300 and OHP 400 do not include any inactive pixel regions. Rather, the projections shown in FIGS. 3 and 4 include non-rectangular regions between non-contiguous imaging regions 302, 402. These and other projections with non-rectangular regions disposed between non-contiguous imaging regions may benefit from the optimization of coding block sizes within these regions as described subsequently herein.

Figure 5:
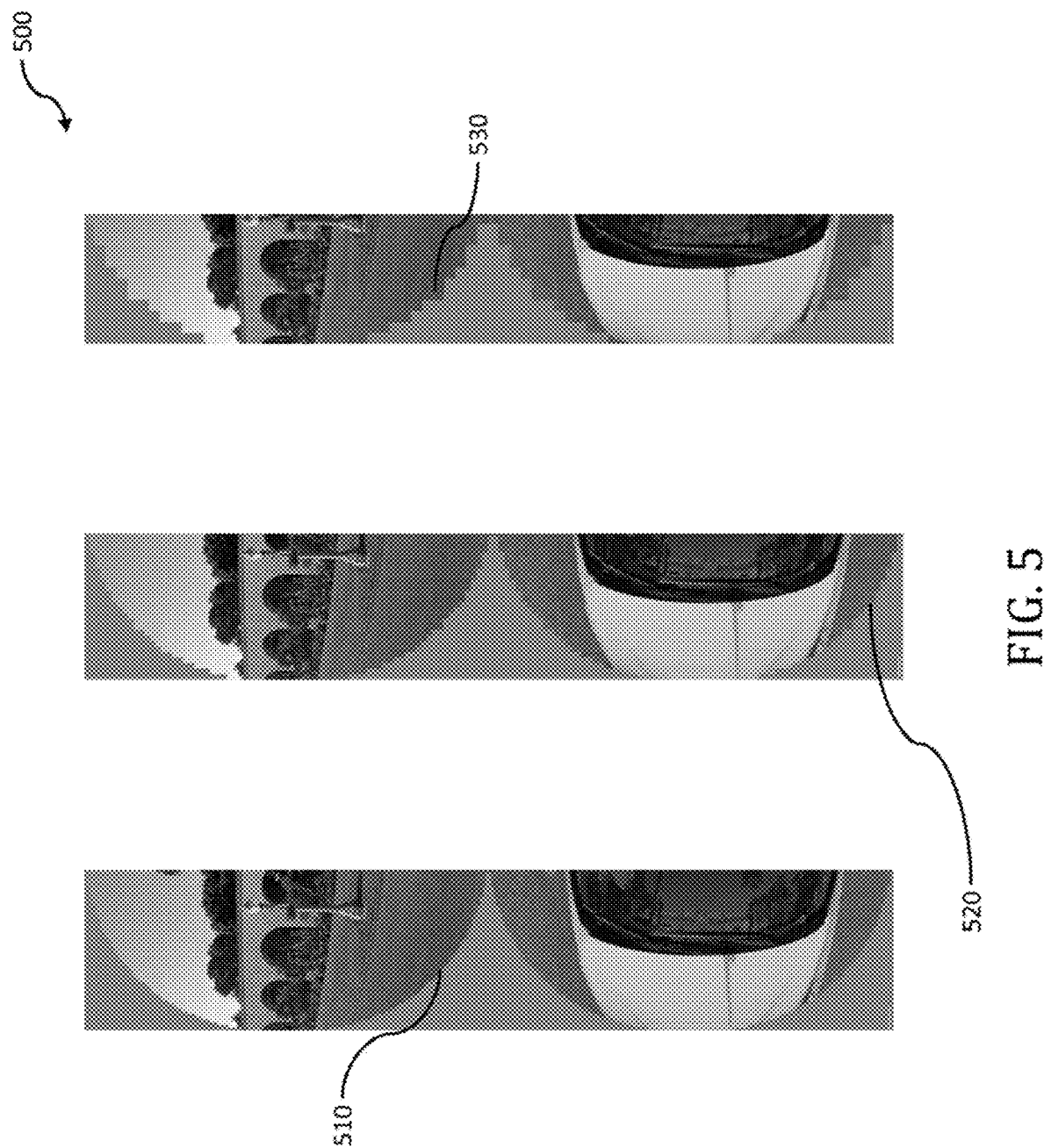
FIG. 5 is an exemplary portion of three (3) RSP frames illustrating various block sizes, useful in describing the principles of the present disclosure.

Referring now to FIG. 5, three exemplary coding block sizes 510, 520, 530 are illustrated for an exemplary non-rectangular regions between non-contiguous imaging regions is shown (here the non-contiguous imaging regions include inactive pixels) for an exemplary portion of an RSP frame 500. The coding block size 510 illustrated in RSP frame 500 are aligned on 8×8 block sizes, the coding block size 520 illustrated in RSP frame 500 are aligned on 16×16 block sizes, while the coding block size 530 illustrated in RSP frame 500 are aligned on 32×32 block sizes. As a brief aside, while the disclosure of 8×8, 16×16, and 32×32 block sizes are considered exemplary, it would be readily apparent to one of ordinary skill given the contents of the present disclosure that other symmetric (e.g., 64×64 block sizes) and non-symmetric block sizes including so-called Asymmetric Motion Partitions (AMP) may be used in alternative variants. For example, exemplary AMP block sizes may include, for example, 8×32 block sizes, 4×8 block sizes, etc. These and other variations would be readily apparent to one of ordinary skill given the contents of the present disclosure.

The selection between these various block sizes may be chosen based on a balance of achieved compression performance as compared with the number of bits needed to transmit a given frame. For example, larger block sizes (e.g., 32×32 block sizes) may result in a larger number of bits needed to transmit a given frame as a result of the inclusion of additional redundant information as compared with smaller block sizes (e.g., 8×8 block sizes) which require less redundant information as compared with the larger block sizes. The reasoning for this is due to the fact that all information within a given RSP frame typically must enable a full 360° panoramic image to be reconstructed. Accordingly, smaller block sizes enable this boundary region between non-contiguous imaging areas to have a finer degree of granularity, and hence are required to include less redundant imaging data than larger block sizes, for example. Additionally, busier portions (e.g., areas where this boundary regions is less homogenous in terms of, for example, pixel color) of a given RSP frame that lie within these non-rectangular regions between non-contiguous imaging regions may benefit (e.g., improved compression efficiencies) from smaller block sizes, while less busy portions (e.g., an image of the sky as but one example) may benefit (e.g., improved compression efficiencies) from larger block sizes.

Figure 7:
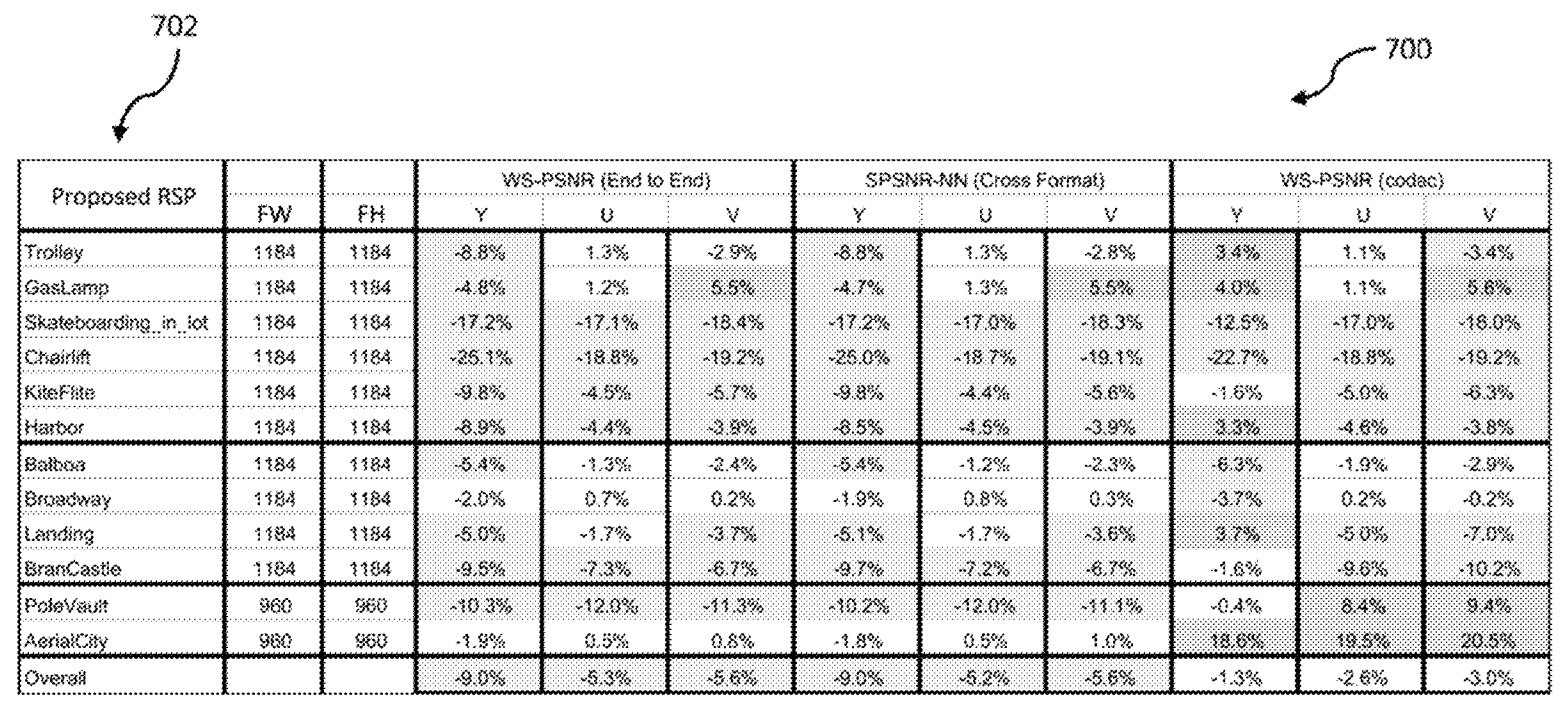

Referring now to FIGS. 6 and 7, exemplary coding gain results are illustrated. For example, FIG. 6 illustrates coding gain results 600 for a variety of different images 602 for an RSP frame in which a circular arc is utilized for the image boundary. In other words, the coding gain results 600 are illustrated where there is little (or no) redundant information carried within the RSP frame. FIG. 7 illustrates coding gain results 700 for a variety of different images 602 for an RSP frame in which this boundary regions has been constructed utilizing a 16×16 coding block size. As can be seen, although the coding gain results 700 may include additional redundant pixel information as compared with the coding gain results 600, a coding gain between 0.7% and 1.0% is achieved for the Luma and Chroma channels, respectively, for the coding of RSP frames utilizing these 16×16 coding block sizes on the boundary regions (e.g., between non-contiguous imaging portions).

Based on the coding results 600 and 700 illustrated, it is not clear if one grid size will work best in all situations, and in fact, the choice in grid size chosen may be content specific. For example, a smaller grid size (e.g., 8×8) may include more inactive pixels, which improves upon coding performance. However, a larger grid (e.g., 64×64) may align well with big block sizes where typical codecs (e.g., HEVC) typically get more coding gain during the encoding process. A 16×16 coding block size may not be too small or too big, and thus may give the best performance on average for typical codecs (e.g., HEVC). Other codecs are envisioned that may utilize even larger coding blocks (e.g., 256×256 coding block size) and hence, the coding gain results may be expected to differ from the results illustrated in FIGS. 6 and 7. As briefly described supra, yet other codecs may have blocks that are non-square (e.g., the aforementioned AMP). AMP may improve upon the coding results further as one may choose different grid sizes for different x and y coordinates, rather than fixing them to be the same for both dimensions.

In addition to optimizing a block coding size for a given frame, block coding sizes may be selected based on a coding unit by coding unit basis. This coding unit by coding unit basis may take into consideration the "busyness" for different portions of the image. For example, in the exemplary context of HEVC codecs, 64×64 block sizes may traditionally prove optimal. However, one may select an 8×8 grid size for a coding unit block for a region of the image that is relatively busy (e.g., that includes a lot of texture information). This 8×8 grid size may be chosen in order to, inter alia, inactivate as many pixels as possible. Other areas of the image may be less busy (e.g., include less texture) such as, for example, images of a sky. In such a scenario, one may select a larger block grid (e.g., a 64×64 block size) as, although there would be additional pixels (redundant information) contained within this larger block size, less processing resources would be required to code these extra pixels. Optimal grid partitioning may be performed on a per picture (or per coding unit) basis. For example, for each image, we may run through all (or an intelligently selected subset) of partition sizes in order to search for all possible grid partitions (and grid partition combinations) to find the optimal grid size(s) for the purpose of finding an optimized balance between coding performance, coding gain and/or for the purpose of optimizing potential seam artifacts during the rendering process.

In addition, optimizing grid sizes for these non-rectangular regions between non-contiguous imaging regions may be based on other factors other than, for example, image "busyness". For example, one may allocate optimal grid sizes based on the quantization parameter (QP) selected for a given region. A higher QP may result in fewer available bits and may help in making a decision on grid size. At high QP values, it may be optimum to use larger block sizes (e.g., 64×64 block sizes), while at lower QP values, it may be optimum to use smaller block sizes (e.g., 16×16 block sizes). For example, at higher QP values, one may not need to worry about spending additional bits on coding the, for example, inactive/active arc of an RSP image (e.g., non-rectangular regions between non-contiguous imaging regions).

Figure 8:
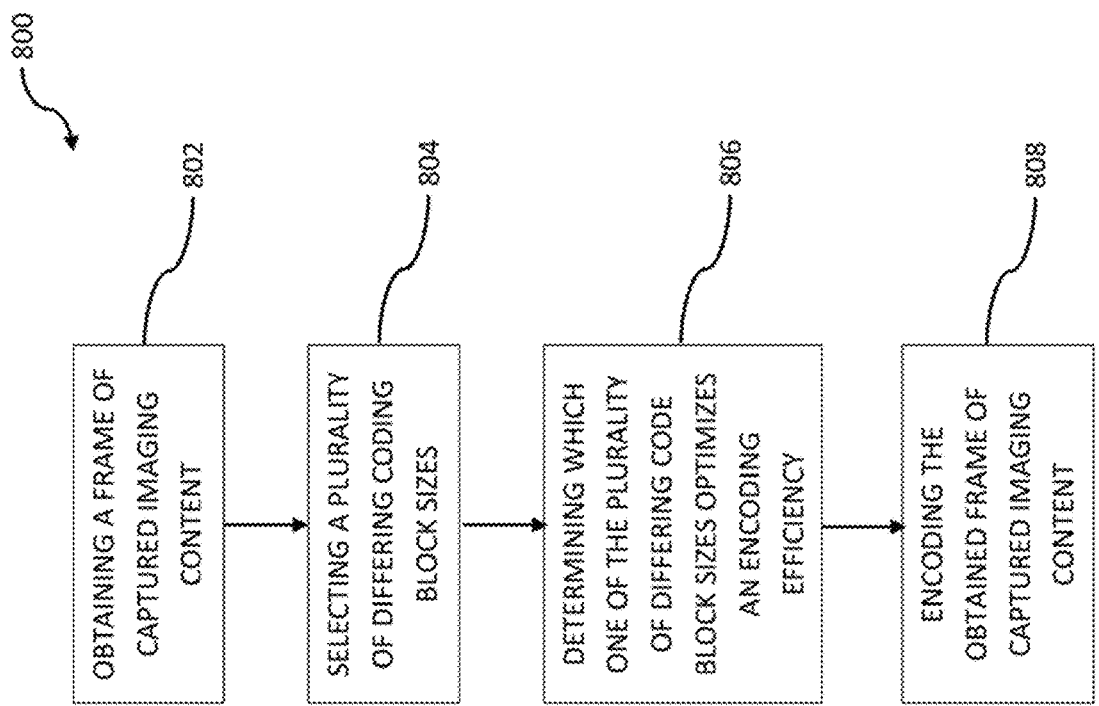
FIG. 8 is a logical flow diagram illustrating an exemplary embodiment for the encoding of obtained frames of captured imaging content, useful in describing the principles of the present disclosure.

Referring now to FIG. 8, an exemplary methodology 800 for the encoding of frames of imaging data is shown and described in detail. At step 802, a frame of captured imaging content is obtained. In some implementations, the obtained frame includes an RSP projection with exemplary non-rectangular regions between non-contiguous imaging regions. These non-contiguous imaging regions may include inactive pixel regions. In other implementations, the obtained frame may include a frame selected from the group consisting of an exemplary SSP frame, ISP frame and OHP frame. In the exemplary context of ISP frames or OHP frames, the non-rectangular regions between non-contiguous imaging regions may include padded regions.

At step 804, an encoder may select a plurality of differing coding block sizes for use in the non-rectangular regions between non-contiguous imaging regions. These coding block sizes may be selected so as to consist of a common sized block for the entire obtained frame. In some implementations, the coding block sizes may differ in size from one coding unit area to another coding unit area within the obtained frame. The coding block sizes may be square in shape (e.g., a 8×8 coding block size, a 16×16 coding block size, a 32×32 coding block size), or alternatively (or in addition to the aforementioned square shaped coding block sizes), some (or all) of the coding block sizes may be rectangular in shape (e.g., AMP).

At step 806, the encoder may determine which one of the plurality of differing code block sizes optimizes an encoding efficiency for the obtained frame. The encoding efficiency may consist of, for example, a trade-off between better objective compression performance and/or between different objective quality levels for seam artifacts that are present when the obtained frame is rendered on, for example, a display device. At step 808, the obtained frame of captured imaging content is encoded in accordance with the determination made at step 806.

Exemplary Apparatus

Figure 9:
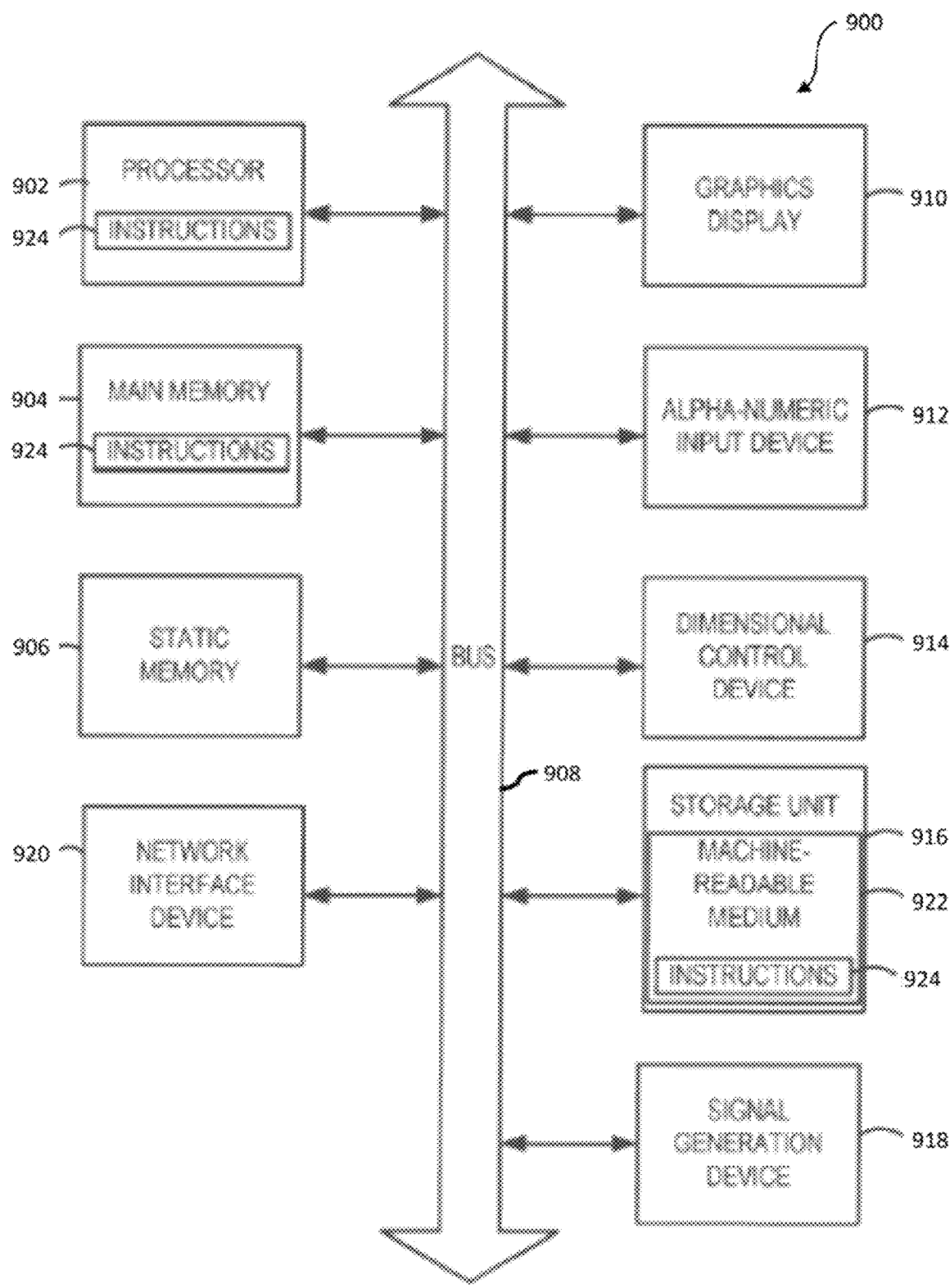
FIG. 9 is a block diagram of an exemplary implementation of a computing device, useful in encoding and/or decoding image data, useful in describing the principles of the present disclosure.

FIG. 9 is a block diagram illustrating components of an example computing system 900 able to read instructions from a computer-readable medium and execute them in one or more processors (or controllers). The computing system in FIG. 9 may represent an implementation of, for example, an image/video processing device for encoding and/or decoding of, for example, RSP frames (or other projection formats that include non-rectangular regions between non-contiguous imaging regions) and/or for the purpose of implementing the methodology of, for example, FIG. 8.

The computing system 900 can be used to execute instructions 924 (e.g., program code or software) for causing the computing system 900 to perform any one or more of the encoding/decoding methodologies (or processes) described herein. In alternative embodiments, the computing system 900 operates as a standalone device or a connected (e.g., networked) device that connects to other computer systems. The computing system 900 may include, for example, an action camera (e.g., a camera capable of capturing, for example, a 360° FOV), a personal computer (PC), a tablet PC, a notebook computer, or other device capable of executing instructions 924 (sequential or otherwise) that specify actions to be taken. In another embodiment, the computing system 900 may include a server. In a networked deployment, the computing system 900 may operate in the capacity of a server or client in a server-client network environment, or as a peer device in a peer-to-peer (or distributed) network environment. Further, while only a single computer system 900 is illustrated, a plurality of computing systems 900 may operate to jointly execute instructions 924 to perform any one or more of the encoding/decoding methodologies discussed herein.

The example computing system 900 includes one or more processing units (generally processor apparatus 902). The processor apparatus 902 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 900 may include a main memory 904. The computing system 900 may include a storage unit 916. The processor 902, memory 904 and the storage unit 916 may communicate via a bus 908.

In addition, the computing system 900 may include a static memory 906, a display driver 910 (e.g., to drive a plasma display panel (PDP), a liquid crystal display (LCD), a projector, or other types of displays). The computing system 900 may also include input/output devices, e.g., an alphanumeric input device 912 (e.g., touch screen-based keypad or an external input device such as a keyboard), a dimensional (e.g., 2-D or 3-D) control device 914 (e.g., a touch screen or external input device such as a mouse, a trackball, a joystick, a motion sensor, or other pointing instrument), a signal capture/generation device 918 (e.g., a speaker, camera, and/or microphone), and a network interface device 920, which also are configured to communicate via the bus 908.

Embodiments of the computing system 900 corresponding to a client device may include a different configuration than an embodiment of the computing system 900 corresponding to a server. For example, an embodiment corresponding to a server may include a larger storage unit 916, more memory 904, and a faster processor 902 but may lack the display driver 910, input device 912, and dimensional control device 914. An embodiment corresponding to an action camera may include a smaller storage unit 916, less memory 904, and a power efficient (and slower) processor 902 and may include multiple image capture devices 918 (e.g., to capture 360° FOV images or video).

The storage unit 916 includes a computer-readable medium 922 on which is stored instructions 924 (e.g., a computer program or software) embodying any one or more of the methodologies or functions described herein. The instructions 924 may also reside, completely or at least partially, within the main memory 904 or within the processor 902 (e.g., within a processor's cache memory) during execution thereof by the computing system 900, the main memory 904 and the processor 902 also constituting computer-readable media. The instructions 924 may be transmitted or received over a network via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store the instructions 924. The term "computer-readable medium" shall also be taken to include any medium that is capable of storing instructions 924 for execution by the computing system 900 and that cause the computing system 900 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java' (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A method for selecting coding block sizes for non-rectangular regions disposed between non-contiguous imaging portions, the method comprising:

obtaining a frame of captured imaging content, the frame of captured imaging content including the non-rectangular regions disposed between the non-contiguous imaging portions;

selecting a plurality of differing coding block sizes for each of a plurality of regions located within the non-rectangular regions disposed between the non-contiguous imaging portions;

determining which one of the plurality of differing coding block sizes improves an encoding efficiency for the obtained frame of captured imaging content as compared with other ones of the plurality of differing coding block sizes; and encoding the obtained frame of captured imaging content in accordance with the determined one of the plurality of differing coding block sizes.

2. The method of claim 1, wherein the selecting of the plurality of differing coding block sizes comprises selecting at least one of a non-symmetric block size and at least one of a symmetric block size.

3. The method of claim 2, wherein the selecting of the at least one symmetric block size comprises selecting a plurality of differing symmetric block sizes.

4. The method of claim 1, wherein the selecting of the plurality of differing coding block sizes is based upon determining a level of busyness for a portion of the obtained frame of captured imaging content.

5. The method of claim 1, wherein the determining is performed by applying one of the plurality of differing coding block sizes on a coding unit by coding unit basis.

6. The method of claim 5, wherein the applying of the one of the plurality of differing coding block sizes on the coding unit by coding unit basis is based on determining of a level of busyness for a portion of the obtained frame of captured imaging content.

7. The method of claim 1, wherein the selecting of the plurality of differing coding block sizes comprises determining a quantization parameter (QP) for a given region of the obtained frame of captured imaging content.

8. A computing system, comprising:

a processor apparatus; and a non-transitory computer readable apparatus comprising a storage medium having a computer program stored thereon, the computer program being configured to, when executed by the processor apparatus, select coding block sizes for non-rectangular regions disposed between non-contiguous imaging portions within an obtained frame of captured imaging content via:

a selection of a plurality of differing coding block sizes for each of a plurality of regions located within the non-rectangular regions disposed between the non-contiguous imaging portions;

determination of which one of the plurality of differing coding block sizes improves an encoding efficiency for the obtained frame of captured imaging content as compared with other ones of the plurality of differing coding block sizes; and encode of the obtained frame of captured imaging content in accordance with the determined one of the plurality of differing coding block sizes.

9. The computing system of claim 8, wherein the selection of the plurality of differing coding block sizes is based upon a determination of a level of busyness for a portion of the obtained frame of captured imaging content.

10. The computing system of claim 8, wherein the determination is performed by application of one of the plurality of differing coding block sizes on a coding unit by coding unit basis over at least a portion of the obtained frame of captured imaging content.

11. The computing system of claim 10, wherein the application of the one of the plurality of differing coding block sizes on the coding unit by coding unit basis is based on a determination of a level of busyness for a portion of the obtained frame of captured imaging content.

12. The computing system of claim 8, wherein the selection of the plurality of differing coding block sizes comprises a determination of a quantization parameter (QP) for a given region of the obtained frame of captured imaging content.

13. The computing system of claim 8, wherein the improvement to the encoding efficiency comprises a trade-off between objective compression performance and objective quality levels for seam artifacts that are present within the obtained frame of captured imaging content.

14. A non-transitory computer readable apparatus comprising a storage medium having a computer program stored thereon, the computer program being configured to, when executed by a processor apparatus, select coding block sizes for non-rectangular regions disposed between non-contiguous imaging portions within an obtained frame of captured imaging content via:
 a selection of a plurality of differing coding block sizes for each of a plurality of regions located within the non-rectangular regions disposed between the non-contiguous imaging portions;
 determination of which one of the plurality of differing coding block sizes improves an encoding efficiency for the obtained frame of captured imaging content as compared with other ones of the plurality of differing coding block sizes; and
 encode of the obtained frame of captured imaging content in accordance with the determined one of the plurality of differing coding block sizes.

15. The non-transitory computer readable apparatus of claim 14, wherein the selection of the plurality of differing coding block sizes is based upon a determination of a level of busyness for a portion of the obtained frame of captured imaging content.

16. The non-transitory computer readable apparatus of claim 14, wherein the determination is performed by application of one of the plurality of differing coding block sizes on a coding unit by coding unit basis over at least a portion of the obtained frame of captured imaging content.

17. The non-transitory computer readable apparatus of claim 16, wherein the application of the one of the plurality of differing coding block sizes on the coding unit by coding unit basis is based on a determination of a level of busyness for a portion of the obtained frame of captured imaging content.

18. The non-transitory computer readable apparatus of claim 14, wherein the selection of the plurality of differing coding block sizes comprises a determination of a quantization parameter (QP) for a given region of the obtained frame of captured imaging content.

19. The non-transitory computer readable apparatus of claim 14, wherein the improvement to the encoding efficiency comprises a trade-off between objective compression performance and objective quality levels for seam artifacts that are present within the obtained frame of captured imaging content.

20. The non-transitory computer readable apparatus of claim 14, wherein the selection of the plurality of differing coding block sizes comprises a selection of at least one of a non-symmetric block size and at least one of a symmetric block size.

* * * * *